(12) United States Patent
Lee et al.

(10) Patent No.: US 8,482,529 B2
(45) Date of Patent: Jul. 9, 2013

(54) COMPUTER INPUT SYSTEM AND INPUT METHOD THEREOF

(75) Inventors: Yong-Der Lee, Taipei (TW); Fong-Chi Chan, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 281 days.

(21) Appl. No.: 12/938,385

(22) Filed: Nov. 3, 2010

(65) Prior Publication Data

US 2011/0109559 A1    May 12, 2011

(30) Foreign Application Priority Data

Nov. 9, 2009  (TW) .............................. 98137931 A

(51) Int. Cl.
*G09G 5/00* (2006.01)
(52) U.S. Cl.
USPC ......................................................... 345/171
(58) Field of Classification Search
USPC ......................................................... 345/171
See application file for complete search history.

(56) References Cited

U.S. PATENT DOCUMENTS

| | | | | |
|---|---|---|---|---|
| 5,952,942 A | * | 9/1999 | Balakrishnan et al. | 341/20 |
| 2010/0231523 A1 | * | 9/2010 | Chou | 345/171 |

FOREIGN PATENT DOCUMENTS

TW    550479    9/2003

* cited by examiner

*Primary Examiner* — Alexander Eisen
*Assistant Examiner* — Robin Mishler
(74) *Attorney, Agent, or Firm* — Jianq Chyun IP Office

(57) ABSTRACT

A computer input system and an input method thereof are disclosed. The computer input system includes a storage unit, a representative number obtaining module and a coding module. The storage unit stores four carry radices, and the four carry radix have one-to-one correspondences to an amount of initial consonants, an amount of head vowels, an amount of vowels and an amount of tones of a phonetic notation symbol, respectively. After the representative number obtaining module obtains four symbol representative numbers according to a Chinese character phonetic notation, the coding module generates a coding number of the Chinese character according to the symbol permutation order, the four carry radices and the four symbol representative numbers.

16 Claims, 7 Drawing Sheets

| Vowel | | | | Head vowel | | Initial consonant | | | | | |
|---|---|---|---|---|---|---|---|---|---|---|---|
| ㄦ 13 | ㄢ 9 | ㄞ 5 | ㄚ 1 | ㄧ 1 | ㄗ 19 | ㄓ 15 | ㄐ 12 | ㄍ 9 | ㄉ 5 | ㄅ 1 | |
| | ㄣ 10 | ㄟ 6 | ㄛ 2 | ㄨ 2 | ㄘ 20 | ㄔ 16 | ㄑ 13 | ㄎ 10 | ㄊ 6 | ㄆ 2 | |
| | ㄤ 11 | ㄠ 7 | ㄜ 3 | ㄩ 3 | ㄙ 21 | ㄕ 17 | ㄒ 14 | ㄏ 11 | ㄋ 7 | ㄇ 3 | |
| | ㄥ 12 | ㄡ 8 | ㄝ 4 | | | ㄖ 18 | | | ㄌ 8 | ㄈ 4 | |

FIG. 2

| Character pronunciation | Coding number |
|---|---|
| ㄈㄧㄠˋ | 1233 |
| ㄈㄨ | 1265 |
| ㄈㄨˊ | 1266 |
| ㄈㄨˇ | 1267 |
| ㄈㄨˋ | 1268 |
| ㄈㄨㄥˋ | 1328 |
| ㄅㄚ | 1405 |

FIG. 4

COMPUTER INPUT SYSTEM AND INPUT METHOD THEREOF

CROSS-REFERENCE TO RELATED APPLICATION

This application claims the priority benefit of Taiwan application serial no. 98137931, filed on Nov. 9, 2009. The entirety of the above-mentioned patent application is hereby incorporated by reference herein and made a part of this specification.

BACKGROUND OF THE INVENTION

1. Field of the Invention

The invention relates to a computer input system and, more particularly, to a Chinese input system.

2. Description of the Related Art

To make electronic devices such as a computer or a mobile phone capable of receiving and recognizing Chinese character input, various coding modes adapted to Chinese information processing system emerge. Among the coding modes, Big-5 and Unicode are the most common coding modes in current Chinese information processing systems, and in a traditional-Chinese information processing system, the Big-5 is the most commonly used.

Users often input Chinese characters via input methods. Generally, Chinese character input method includes the pronunciation-based input method and the character pattern-based input method. The pronunciation-based input method neither requires the user to memory the roots nor requires the user to practice separating characters, and as a result, the pronunciation-based input method become more and more popular.

Since the phonetic notation of the Chinese character is composed of an initial consonant, a head vowel, a vowel and a tone, in the pronunciation-based Chinese character input methods, after the electronic device confirms that the user finishes the input, the inputted phonetic notation symbol is compared with the content in the Chinese character database one by one to find the candidate characters for the user to select. However, since Chinese characters using the Big-5 and Unicode cannot be sorted effectively, it consumes a lot of time in comparison in the Chinese character database. This greatly reduces the efficiency of the Chinese characters input, and the user may feel inconvenient in operation.

BRIEF SUMMARY OF THE INVENTION

A computer input system is disclosed, in which the Chinese characters may be coded to corresponding numbers according to phonetic notations, thereby building a phonetic database which may find the Chinese characters quickly.

An input method is disclosed, which may find the character pronunciation inputted by the user from the phonetic database via table lookup, thereby providing proper input candidate characters.

A computer input system is disclosed which including a storage unit, a representative number obtaining module and a coding module coupled to the storage unit and the representative number obtaining module. The storage unit stores a pre-determined symbol permutation order and four carry radices. The four carry radices have a one-to-one correspondence to an amount of initial consonants, an amount of head vowels, an amount of vowels and an amount of tones of a phonetic notation symbol. The representative number obtaining module obtains four corresponding symbol representative numbers according to a Chinese character phonetic notation, and the coding module generates a coding number of the Chinese character according to the symbol permutation order, the four carry radices and the four symbol representative numbers.

In an embodiment, the four carry radices are the amount of the initial consonants plus one, the amount of the head vowels plus one, the amount of the vowels plus one and the amount of the tones, respectively.

In an embodiment, 21 initial consonants of the phonetic notation symbol have a one-to-one correspondence to 21 initial consonant representative numbers. When the Chinese character phonetic notation includes one of the 21 initial consonants, the representative number obtaining module takes one of the corresponding 21 initial consonant representative numbers as one of the four symbol representative numbers, and when the Chinese character phonetic notation does not include any of the 21 initial consonants, the representative number obtaining module takes a pre-determined representative number as one of the four symbol representative numbers.

In an embodiment, three head vowels of the phonetic notation symbol have a one-to-one correspondence to three head vowel representative numbers. When the Chinese character phonetic notation includes one of the three head vowels, the representative number obtaining module takes one of the three head vowel representative numbers as one of the four symbol representative numbers, and when the Chinese character phonetic notation does not include any of the three head vowels, the representative number obtaining module takes a pre-determined representative number as one of the four symbol representative numbers.

In an embodiment, 13 vowels of the phonetic notation symbol have a one-to-one correspondence to 13 vowel representative numbers. When the Chinese character phonetic notation includes one of the 13 vowels, the representative number obtaining module takes one of the 13 vowel representative number as one of the four symbol representative numbers, and when the Chinese character phonetic notation does not include any of the 13 vowels, the representative number obtaining module takes a pre-determined representative number as one of the four symbol representative numbers.

In an embodiment, five tones of the phonetic notation symbol have a one-to-one correspondence to five tone representative numbers. The representative number obtaining module obtains the tone of the Chinese character phonetic notation in the five tones, and takes the corresponding tone representative number of the obtained tone in the five tone representative numbers as one of the four symbol representative numbers.

In an embodiment, the coding module arranges the four symbol representative numbers according to the symbol permutation order, and defines a carry sequence of the four carry radices according to the symbol permutation order and the relations between the four carry radices and the amount of the initial consonants, the amount of the head vowels, the amount of the vowels and the amount of the tones. Then, the coding module converts the four arranged symbol representative numbers to a decimal number according to the four carry radices and the carry sequence, and take the decimal number as the coding number of the Chinese character. The symbol permutation order from left to right is an initial consonant, a head vowel, a vowel and a tone.

In an embodiment, the storage unit further includes a phonetic database, and the coding module defines the Chinese character phonetic notation as a character pronunciation and records the relation between the character pronunciation and a coding number in the phonetic database.

An input method used in a computer input system with a storage unit are also disclosed. The storage unit stores a symbol permutation order, four carry radices and a phonetic database. The phonetic database records multiple character pronunciations and coding numbers corresponding to the character pronunciations. Each of the coding numbers is generated according to four symbol representative numbers, the symbol permutation order and the four carry radices corresponding to the character pronunciation. The four carry radices have a one-to-one correspondence to an amount of initial consonants, an amount of head vowels, an amount of vowels and an amount of tones of the phonetic notation symbol. The character pronunciations are stored in the phonetic database orderly according to the corresponding coding numbers. In the method, when at least an input phonetic notation is obtained, four input symbol representative numbers representing the phonetic notation are obtained. Then, a number is calculated according to the four carry radices, the symbol permutation order and four input symbol representative numbers. If the phonetic database has the coding number in accordance with the number, at least a Chinese character corresponding to the character pronunciation corresponding to the coding number in accordance with the number is obtained as the candidate character. At last, an input character is selected from the candidate character according to the selecting command.

In an embodiment, in the step of obtaining the four input symbol representative numbers representing the phonetic notation, the steps as follows are included. If the phonetic notation includes one of the 21 initial consonants, an initial consonant representative number corresponding to one of the included 21 initial consonants is taken as one of the four input symbol representative numbers; and if the phonetic notation does not include any of the 21 initial consonants, a pre-determined representative number is taken as one of the four input symbol representative numbers. In addition, if the phonetic notation includes one of the three head vowels, a head vowel representative number corresponding to one of the included three head vowels is taken as one of the four input symbol representative numbers; and if the phonetic notation does not include any of the three head vowels, a pre-determined representative number is taken as one of the four input symbol representative numbers. If the phonetic notation includes one of the 13 vowels, a vowel representative number corresponding to one of the included 13 vowels is taken as one of the four input symbol representative numbers; and if the phonetic notation does not include any of the 13 vowels, a pre-determined representative number is taken as one of the four input symbol representative numbers. If the phonetic notation includes one of the five tones, a tone representative number corresponding to one of the included five tones is taken as one of the four input symbol representative numbers; and if the phonetic notation does not include any of the five tones, a pre-determined representative number is taken as one of the four input symbol representative numbers.

In an embodiment, the step of calculating the numbers according to the four carry radices, the symbol permutation order and the four input symbol representative numbers further includes: arranging the four input symbol representative numbers according to the symbol permutation order; defining the carry sequence of the four carry radices according to the symbol permutation order and the relations between the four carry radices and the amount of the initial consonants, the amount of the head vowels, the amount of the vowels and the amount of the tones; converting the arranged four input symbol representative numbers to a decimal number according to the four carry radices and the carry sequence; and taking the decimal number as the number.

In an embodiment, the symbol permutation order from left to right is an initial consonant, a head vowel, a vowel and a tone.

To sum up, the Chinese character is coded into specific coding number according to the Chinese character phonetic notation. Therefore, after all the character pronunciation are coded according to the arranged coding number to build the database, every time when the user uses the phonetic notation input method to input Chinese characters, the corresponding pronunciation can be found quickly in the table lookup way in the database, and the possible candidate characters are displayed to allow the user to select. Therefore, the comparison time in inputting Chinese characters in the phonetic notation input method is reduced, and the efficiency of the input method is increased.

These and other features, aspects and advantages of the present invention will become better understood with regard to the following description, appended claims, and accompanying drawings.

BRIEF DESCRIPTION OF THE DRAWINGS

FIG. 2 is a schematic diagram showing the relation between the phonetic notation symbols and their representative numbers in an embodiment of the invention.

FIG. 4 is a schematic diagram showing part of the storage unit in an embodiment of the invention.

DETAILED DESCRIPTION OF THE EMBODIMENTS

Figure 1A:
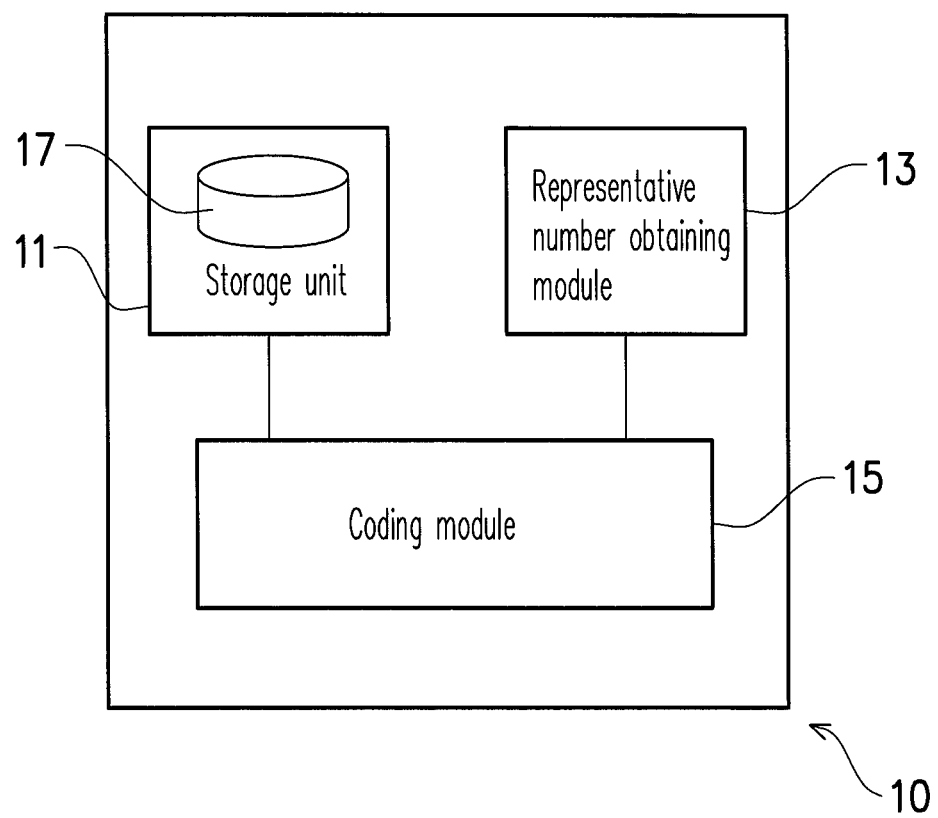
FIG. 1A is a block diagram showing the computer input system in an embodiment of the invention.

FIG. 1A is a block diagram showing the computer input system in an embodiment. As shown in FIG. 1A, a computer input system 10 includes a storage unit 11, a representative number obtaining module 13 and a coding module 15 coupled to the storage unit 11 and the representative number obtaining module 13. In the embodiment, the computer input system 10 may be an input system of a desktop computer, a notebook computer, a server or other electronic devices.

The storage unit 11 may be storage media such as a memory or a hard disk, which is not limited thereto. The representative number obtaining module 13 and the coding module 15 may be hardware or software or their combination with calculating ability. In the embodiment, the computer input system 10 may code the Chinese character according to the Chinese character phonetic notation via the information provided by the storage unit 11 and the operation of the representative number obtaining module 13 and the coding module 15.

Figure 1B:
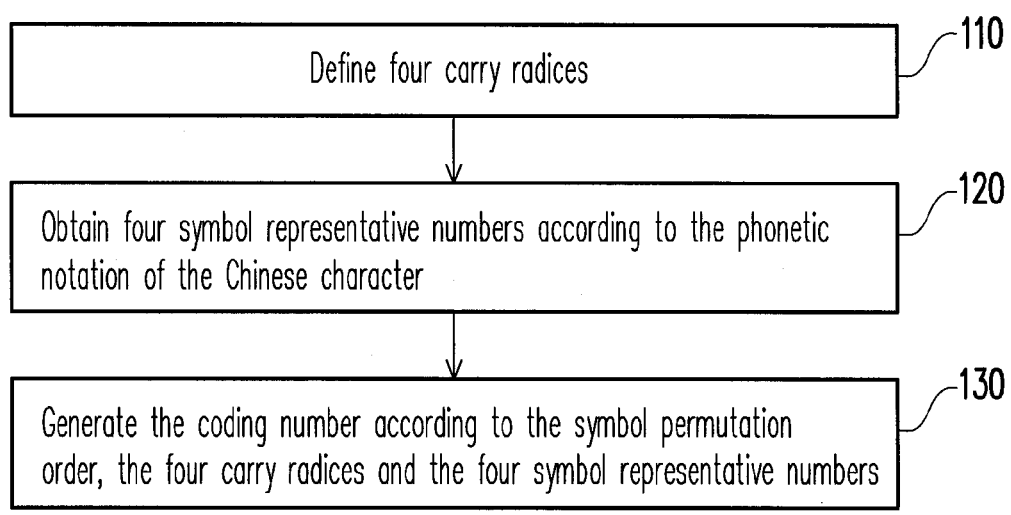
FIG. 1B is a flow chart showing the phonetic-based coding method for inputting Chinese characters in a first embodiment of the invention.

To further illustrate the operating flow path of the computer input system 10 in coding the Chinese characters, another embodiment hereinafter is taken for illustration. FIG. 1B is a flow chart showing the phonetic-based Chinese character coding method in an embodiment. Firstly, as shown in step 110, four carry radices are defined in the storage unit 11, and the four carry radices have a one-to-one correspondence to an amount of initial consonants, an amount of head vowels, an amount of vowels and an amount of tones of the phonetic notation symbol, respectively. Detailedly, the Chinese character phonetic notations totally include 21 initial consonants, three head vowels, 13 vowels and five tones. The four carry radices in the embodiment are the amount of the initial consonants plus one (namely 22), the amount of the head vowels plus one (namely four), the amount of the vowels plus one (namely 14) and the amount of the tone (namely five), respectively.

In step 120, the representative number obtaining module 13 obtains four symbol representative numbers according to the phonetic notation of Chinese character to be coded. In the embodiment, there are one-to-one correspondences between the 21 initial consonants of the phonetic notation symbol and the 21 initial consonant representative numbers (such as 1 to 21), the three head vowels one-to-one and the three head vowel representative numbers (such as 1 to 3), the 13 vowels and the 13 vowel representative numbers (such as 1 to 13), and the five tones and the five tone representative numbers (such as 0 to 4), respectively. Therefore, when the phonetic notation of the Chinese character to be coded includes one of the 21 initial consonants, the representative number obtaining module 13 takes one of the initial consonant representative numbers corresponding to the initial consonant as one of the four symbol representative numbers, and when the phonetic notation of the Chinese character to be coded does not include any initial consonant, the representative number obtaining module 13 takes a pre-determined representative number (such as 0) as one of the four symbol representative numbers. Similarly, when the phonetic notation of the Chinese character includes one of the 3 head vowels, the representative number obtaining module 13 takes one of the head vowel representative numbers corresponding to the head vowel as one of the four symbol representative numbers, and when the phonetic notation of the Chinese character does not include any head vowel, the representative number obtaining module 13 takes a pre-determined representative number (such as 0) as one of the four symbol representative numbers. When the Chinese character phonetic notation includes one of the 13 vowels, the representative number obtaining module 13 takes one of the vowel representative numbers corresponding to the vowel as one of the four symbol representative numbers, and when the Chinese character phonetic notation does not include any vowel, the representative number obtaining module 13 takes a pre-determined representative number (such as 0) as one of the four symbol representative numbers. Besides, the representative number obtaining module 13 may obtain the tone of the Chinese character to be coded from the five tones of the phonetic notation, and takes the tone representative number in the corresponding five tone representative numbers as one of the four symbol representative numbers.

FIG. 2 is a schematic diagram showing the relations between the initial consonants, the head vowels and the vowels in the phonetic notation symbol and their representative numbers. In the following embodiment, the tone representative numbers of the first tone, the second tone, the third tone, the fourth tone and the neutral tone of the phonetic notation are 0, 1, 2, 3, and 4 orderly. Therefore, if the Chinese character to be coded is "聲", since the phonetic notation is "ㄕㄥ", the obtained four symbol representative numbers are 17, 0, 12, and 0. If the Chinese character to be coded is "國", the phonetic notation is "ㄍㄨㄛˊ", and the obtained four symbol representative numbers are 9, 2, 2, and 1. However, the relations between the phonetic notation symbols, the tones and their representative numbers are just an example, they are not used to limit the invention. In other words, as long as there are one-to-one correspondences between the 21 initial consonants and the 21 initial consonant representative numbers, three head vowels and the three head vowel representative numbers, 13 vowels and the 13 vowel representative numbers, and five tones and the five tone representative numbers, respectively, it is in the scope of the invention.

After the four symbol representative numbers are obtained according to the Chinese character phonetic notation, as shown in step 130, the coding module 15 generates the coding number of the Chinese character according to the symbol permutation order and the four carry radices stored in the storage unit 11 and the four symbol representative numbers obtained by the representative number obtaining module 13. Detailedly, the coding module 15 first arranges the four symbol representative numbers according to the symbol permutation order, and then defines the carry sequence of the four carry radices according to the symbol permutation order and the relations between the four carry radices and the amount of the initial consonants, the amount of the head vowels, the amount of the vowels and the amount of the tones. At last, the coding module 15 converts the re-arranged four symbol representative numbers to a decimal number according to the four carry radices and the carry sequence, and takes the converted decimal number as the coding number of the Chinese character.

Supposing the re-arranged four symbol representative numbers from left to right are W, X, Y and Z according to the symbol permutation order, and the four carry radices from left to right are r1, r2, r3 and r4 according to the carry sequence, in the embodiment, the coding module 15 takes the re-arranged four symbol representative numbers as a four-bit number, and since the bits correspond to different carry radices, respectively, the coding module 15 may take the following formula to convert the four-bit number to the decimal number (namely the coding number):

$$\text{coding number} = W \times (r2 \times r3 \times r4) + X \times (r3 \times r4) + Y \times (r4) + Z.$$

For example, if the Chinese character to be coded is "喜", the symbol permutation order from left to right is the head vowel, the tone, the vowel and the initial consonant, the four symbol representative numbers from left to right are 2, 0, 0, and 9, and the four carry radices from left to right are 4, 5, 14 and 22. Therefore, the coding number is 3089 (namely 2×(5×14×22)+0×(14×22)+0×(22)+9).

In another embodiment, if the Chinese character to be coded is "聲", the symbol permutation order from left to right is the initial consonant, the head vowel, the vowel and the tone, which is the common input order, the four symbol representative numbers from left to right are 17, 0, 12, and 0, and the four carry radices from left to right are 22, 4, 14 and 5. Therefore, the coding number is 4820 (namely 17×(4×14×5)+0×(14×5)+12×(5)+0).

After the steps in FIG. 1B are performed, the coding numbers are generated according to the Chinese character phonetic notations. In other words, Chinese characters with the same pronunciation have the same coding number, and the coding module 15 defines the Chinese character phonetic notation as a character pronunciation, and records the corresponding relation between the character pronunciation and the coding number in the phonetic database 17 of the storage unit 11. When the phonetic database 17 is built, only 6160 (namely 22×4×14×5) arrays are used.

After all the coding numbers of the Chinese characters are calculated by the method in FIG. 1, and the whole phonetic database 17 is built in the storage unit 11, the following embodiment shows the detailed steps of inputting phonetic notation quickly and selecting the correct Chinese character when the user uses the phonetic notation input method in the computer input system 10.

Figure 3:
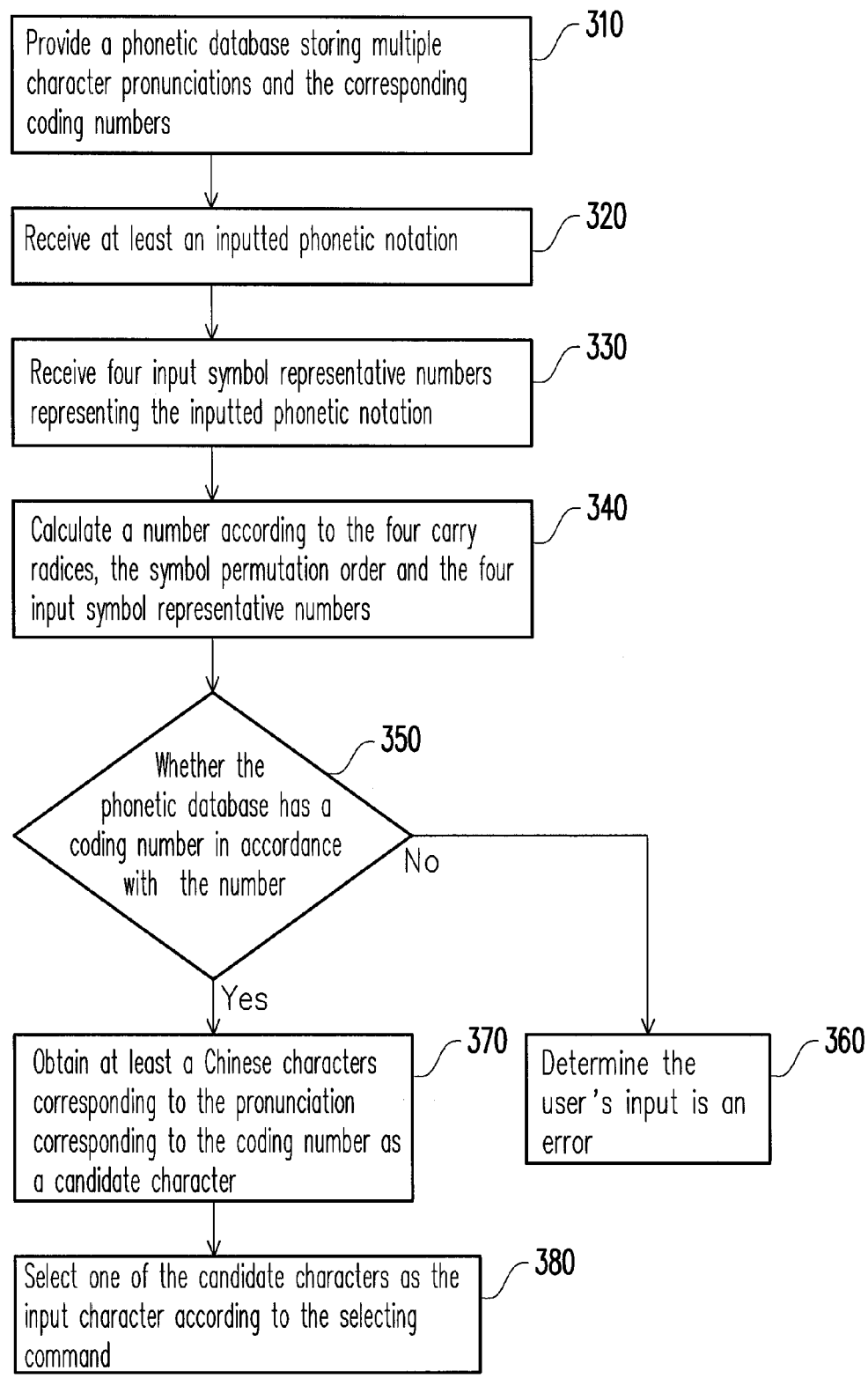
FIG. 3 is a flow chart showing the input method in a first embodiment of the invention.

FIG. 3 is a flow chart showing the input method according to an embodiment. First, as shown in step 310, the phonetic database 17 stored in the storage unit 11 is provided. The phonetic database 17 stores all the character pronunciations and the coding numbers corresponding to the character pronunciations. In the embodiment, the storage unit 11 also stores a symbol permutation order and four carry radices. The coding number corresponding to each character pronunciation is generated according to four symbol representative numbers representing the corresponding character pronunciation, the symbol permutation order and four carry radices. The character pronunciations are orderly stored in the phonetic database 17 according to the corresponding coding numbers. Since the method for generating the coding number of the character pronunciation is illustrated in the above embodiment, and it is not illustrated herein for a concise purpose.

Then, in step 320, at least an inputted phonetic notation is received, and as shown in step 330, four input symbol representative numbers representing the inputted phonetic notation are obtained. In the embodiment, there are one-to-one correspondences between the 21 initial consonants of the phonetic notation symbol and the 21 initial consonant representative numbers, the three head vowels and the three head vowel representative numbers, the 13 vowels and the 13 vowel representative numbers, and the five tones and the five tone representative numbers, respectively. Furthermore, the corresponding relations between the initial consonant, the head vowel, the vowel, the tone and their representative numbers are the same as that used in building the phonetic database 17. If the inputted phonetic notation includes one of the 21 initial consonants, the initial consonant representative number corresponding to the included initial consonant is taken as one of the four symbol representative numbers, and if the inputted phonetic notation does not include any initial consonant, a pre-determined representative number (the pre-determined representative number needs to be the same as that used in building the phonetic database 17, such as 0) is taken as one of the four symbol representative numbers. In addition, if the inputted phonetic notation includes one of the three head vowels, a head vowel representative number corresponding to the one of the three the head vowels is taken as one of the four symbol representative numbers, and if the phonetic notation does not include any head vowel, a pre-determined representative number is taken as one of the four symbol representative numbers. If the inputted phonetic notation includes one of the 13 vowels, a vowel representative number corresponding to the one of the 13 vowels is taken as one of the four symbol representative numbers, and if the inputted phonetic notation does not include any vowel, a pre-determined representative number is taken as one of the four symbol representative numbers. If the phonetic notation includes one of the five tones, the tone representative number corresponding to the one of the five included tones is taken as one of the four input symbol representative numbers, and if the phonetic notation does not include the tone, the pre-determined representative number is taken as one of the four input symbol representative numbers.

Then, as shown in step 340, the number corresponding to the inputted phonetic notation is calculated according to the four carry radices, the symbol permutation order (for example, the symbol permutation order from left to right is the initial consonant, the head vowel, the vowel, and the tone) and the four input symbol representative numbers. The symbol permutation order and the four carry radices should be the same as those used in building the phonetic database 17. Therefore, since the method for calculating the number is the same as or similar to the method for calculating the coding number in the above embodiments, it is not illustrated herein again for a concise purpose.

After the number is calculated, in step 350, whether the phonetic database 17 has a coding number in accordance with the number is determined. The step may be achieved by a table lookup way to obtain the determining result quickly. If the phonetic database 17 does not have a coding number in accordance with the number, it means the input pronunciation is an invalid character pronunciation. Therefore, as shown in step 360, it is determined that the user's input is an error. However, if the corresponding coding number can be found in the phonetic database 17, step 370 is performed to obtain all the Chinese characters corresponding to the character pronunciation corresponding to the coding number as the candidate characters. At last in step 380, one of the candidate characters is selected as the input character according to the selecting command from the user.

After the number of the inputted phonetic notation is calculated, in the input method, a table lookup way is used to directly determine whether the corresponding coding number can be obtained, and the corresponding candidate characters are displayed. It does not need to compare the phonetic notation symbols, and therefore the time interval between inputting the phonetic notation and selecting the correct input character is shortened greatly.

In another embodiment, the user does not need to input the phonetic notation according to the pre-determined symbol permutation order. The phonetic notation inputted by the user is automatically converted to the pre-determined symbol permutation order before looking up whether there are corresponding pronunciations in the database, and then the number is calculated to perform the table lookup.

In still another embodiment, even if the user does not finish inputting the phonetic notation symbol of the Chinese character, the invention also may calculate the corresponding number according to the currently-received phonetic notation, and may find multiple proper character pronunciations from the phonetic database and display all the corresponding Chinese characters as the candidate characters to allow the user to select. Therefore, the user may select the Chinese character which needs to be input even if the input is not finished. FIG. 4 is a schematic diagram showing part of the phonetic database in an embodiment. Supposing the currently obtained phonetic notation is "ㄈㄨ", according to the input method, all the character pronunciations which include the "ㄈㄨ" in the phonetic database, such as "ㄈㄨ","ㄈㄨˊ","ㄈㄨˇ","ㄈㄨˋ" and "ㄈㄨㄥˋ" are selected, and the Chinese characters corresponding to the character pronunciations are taken as candidate characters to allow the user to select.

Figure 5:
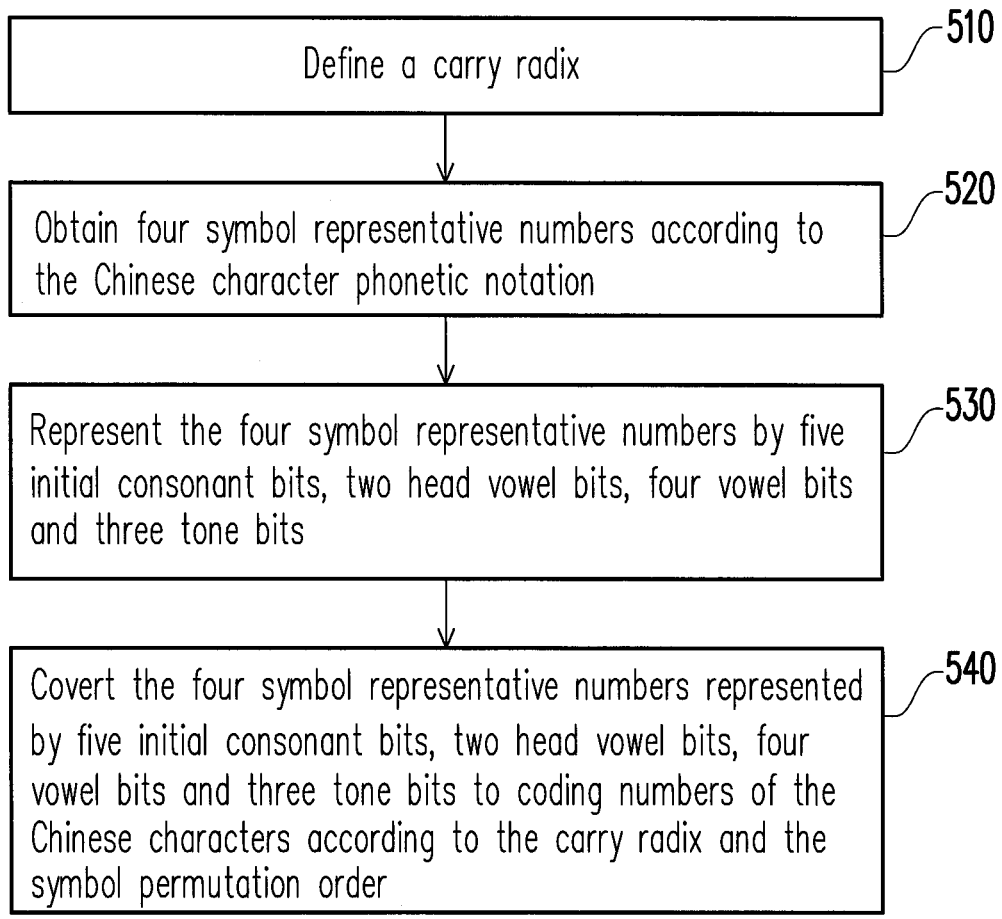
FIG. 5 is a flow chart showing the phonetic-based coding method for inputting the Chinese characters in a second embodiment of the invention.

In the computer input system 10 of the above embodiments, the Chinese characters are coded according to a floating numeral system, and the coding mode is used to build the phonetic database to be used in the phonetic-based input method. In the computer input system 10 of the following embodiment, the Chinese characters are coded according to a constant numeral system. FIG. 5 is a flow chart showing the phonetic-based coding method for inputting the Chinese characters in a second embodiment. Firstly, as shown in step 510, a carry radix is defined in the storage unit 11, in the following part, the carry radix is supposed to be 2.

Then, as shown in step 520, the representative number obtaining module 13 obtains four symbol representative numbers according to the phonetic notation of the Chinese character to be coded. In the embodiment, there are one-to-one correspondences between the 21 initial consonants of the phonetic notation symbol and the 21 initial consonant representative numbers (such as 1 to 21), the 3 head vowels and the 3 head vowel representative numbers (such as 1 to 3), the 13 vowels and the 13 vowel representative numbers (such as 1 to 13), and the five tones and the five tone representative numbers (such as 0 to 4). Therefore, when the Chinese character phonetic notation includes one of the 21 initial consonants, the representative number obtaining module 13 takes one of the initial consonant representative numbers corresponding to the initial consonant as one of the four symbol representative numbers, and when the Chinese character phonetic notation does not include any initial consonant, the representative number obtaining module 13 takes a pre-determined representative number (such as 0) as a first representative number of the four symbol representative numbers. Similarly, when the Chinese character phonetic notation includes one of the three head vowels, the representative number obtaining module 13 takes the corresponding head vowel representative number as a second representative number in the four symbol representative numbers, and when the Chinese character phonetic notation does not include any head vowel, a representative number obtaining module 13 takes a pre-determined representative number as the second representative number. If the Chinese character phonetic notation includes one of the 13 vowels, the representative number obtaining module 13 takes the corresponding vowel representative number as the third representative number of the four symbol representative numbers, and when the Chinese character phonetic notation does not include any vowel, the representative number obtaining module 13 takes a pre-determined representative number as the third representative number. Besides, the representative number obtaining module 13 may obtain the tone included in the Chinese character phonetic notation and take the tone representative number in the five tone representative numbers as the fourth representative number in the four symbol representative numbers.

If the carry radix is defined as 2, since each Chinese character may be composed of one of 21 initial consonants, one of three head vowels, one of 13 vowels and one of five tones, and some character phonetic notations may not include the initial consonant, the head vowel or the vowel. Therefore, five initial consonant bits with binary system are needed to represent the 21 initial consonant and the case that the initial consonant does not appear. Similarly, two head vowel bits with the binary system are needed to represent the three head vowel and the case that the head Vowel does not appear. Four vowel bits with binary system are needed to represent the 13 vowel and the case that the vowel does not appear. In addition, five tones needs to be represented by three tone bits with binary system. Then, as shown in step 530, the coding module 15 uses five initial consonant bits, two head vowel bits, four vowel bits and three tone bits to represent the four symbol representative number, respectively. Detailedly, the coding module 15 uses five initial consonant bits to represent the binary number of the first representative number, and uses two head vowel bits to represent the binary number of the second representative number, uses four vowel bits to represent the binary number of the third representative number, and uses three tone bits to represent the binary number of the fourth representative number.

At last in step 540, the coding module 15 converts the four symbol representative numbers represented by the five initial consonant bits, the two head vowel bits, the four vowel bits and the three tone bits to the coding number of the Chinese characters according to a carry radix and a symbol permutation order. In the embodiment, the coding module 15 first arranges the five initial consonant bits, the two head vowel bits, the four vowel bits and the three tone bits representing the four symbol representative numbers, respectively, according to the symbol permutation order, and then converts the five initial consonant bits, the two head vowel bits, the four vowel bits and the three tone bits to a decimal number. At last, the decimal number is used as the coding number of the Chinese character.

For example, supposing the corresponding relations between the phonetic notation symbols and their representative numbers are as shown in FIG. 2, the five tones of the phonetic notation which is the first tone, the second tone, the third tone, the fourth tone and the neutral tone are 0, 1, 2, 3, and 4, taking the Chinese character to be coded is ""國"" as an example, the first, second, third and fourth representative numbers obtained by the representative number obtaining module 13 are 9, 2, 2, and 1. The coding module 15 uses five initial consonant bits, two head vowel bits, four vowel bits and three tone bits to represent the four symbol representative numbers, which are "01001", "10", "0010" and "001". Supposing the symbol permutation order from left to right is the head vowel, the tone, the vowel and the initial consonant, in step 540, the five initial consonant bits, the two head vowel bits, the four vowel bits and the three tone bits representing the four symbol representative numbers may be re-arranged by the coding module 15 to be "10001001001001", and the four binary bits can be converted to be decimal number 9289 as the coding number.

Figure 6:
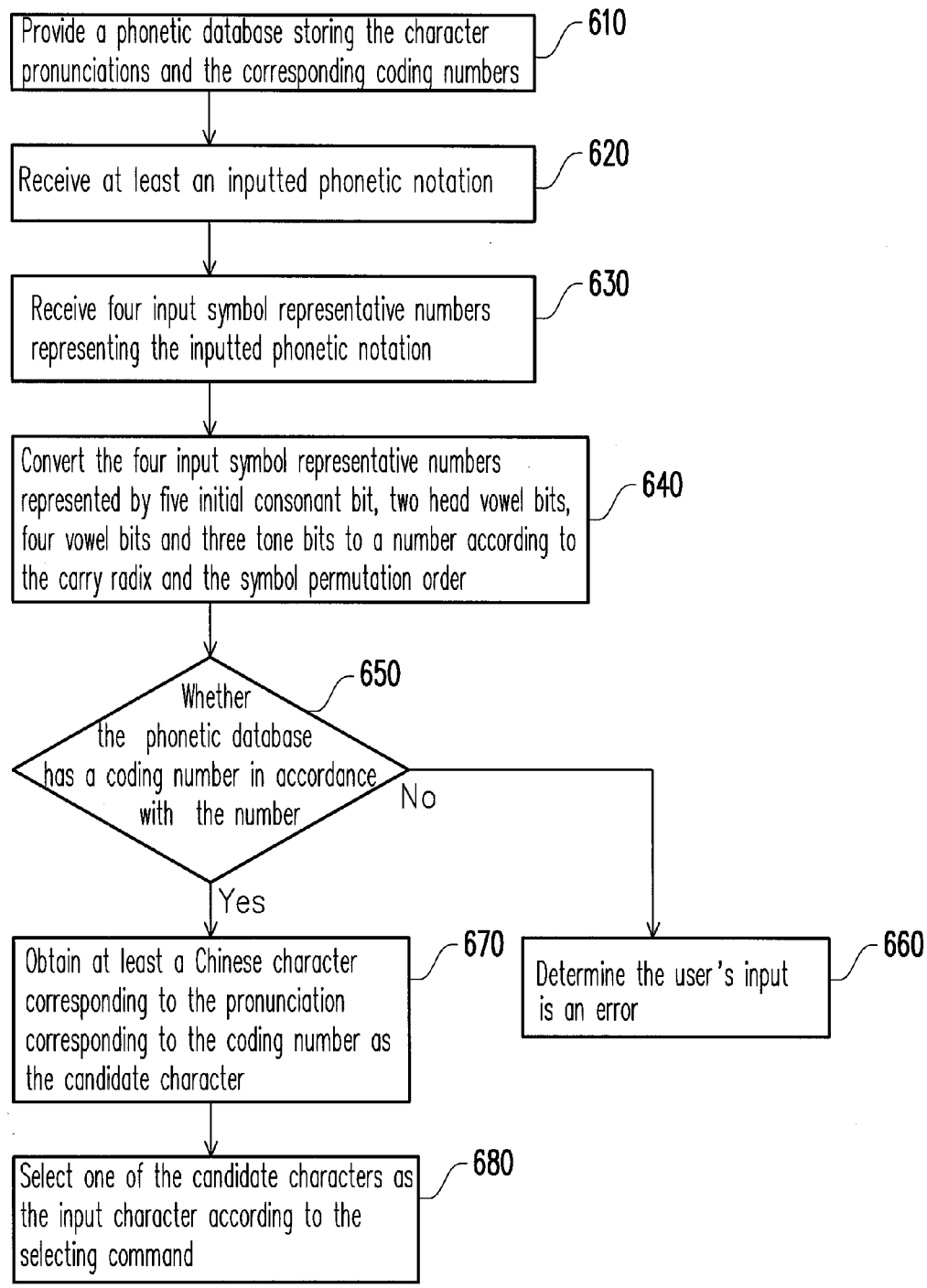
FIG. 6 is a flow chart showing the input method in a second embodiment of the invention.

The pronunciations of the Chinese characters can be coded via steps in FIG. 5 to build a phonetic database 17 in the storage unit 11 to record the character pronunciations and the corresponding coding numbers. The following embodiment is used to illustrate the detailed steps when the phonetic database 17 is used in the phonetic notation input method. FIG. 6 is a flow chart showing the phonetic-based input method in the second embodiment of the invention. As shown in step 610, first a phonetic database 17 is provided which stores multiple character pronunciations and the coding numbers corresponding to the character pronunciations. The character pronunciations are stored in the phonetic database 17 orderly according to the corresponding coding numbers. Since the coding numbers of the character pronunciations in the phonetic database 17 are generated according to the coding mode shown in FIG. 5, they are not illustrated herein for a concise purpose.

Then in step 620, at least a phonetic notation input is received, and as shown in step 630, four input symbol representative numbers for representing the input phonetic notation are obtained. Then in step 640, the four input symbol representative number represented by the five initial consonant bits, the two head vowel bits, the four vowel bits and the three tone bits are converted to a decimal number according to the carry radix and the symbol permutation order. Especially, the corresponding relation referred when the input symbol representative number is obtained should be the same as the relation used in building the phonetic database 17. The carry radix and the symbol permutation order referred in calculating the number also should be the same as the base and order in building the phonetic database 17. Since the way of obtaining the input symbol representative number and the way of calculating the number is the same as or similar to the steps in coding the Chinese character, they are not illustrated herein.

After the number for representing the input phonetic notation is calculated, step 650 is performed to determine whether there are coding numbers in accordance with the number in the phonetic database 17. If the corresponding coding number does not exist, it means the phonetic notation inputted by the user cannot configure a valid character pronunciation. Therefore, as shown in step 660, it is determined that the user's input is an error. If the coding number can be found in the phonetic database 17, as shown in step 670, all the Chinese characters corresponding to the character pronunciation corresponding to the coding number are taken as the candidate characters. After the candidate characters are displayed, as shown in step 680, according to the selecting command, one of the candidate characters is selected as the correct input character.

In the embodiment, a table lookup way is used to determine whether the phonetic database 17 has the coding number in accordance with the number, and all possible candidate characters are displayed. Since the invention does not need to compare the phonetic notation symbols one by one, the speed of displaying the candidate character is increased. Therefore, the user also may select the needed input character quickly. In other embodiments, although the inputted phonetic notation does not compose the needed Chinese character, the method also may find the possible candidate characters from the coding numbers stored in the database to allow the user to select, thereby simplifying the amount of the phonetic notation symbol and increasing the speed the input Chinese characters.

To sum up, in the phonetic-based coding method for inputting the Chinese characters, the Chinese character phonetic notation may be coded to be a number, and the Chinese character phonetic database which facilitates the arrangement and search is built according to the number. When the Chinese character phonetic database is used in an input method, the corresponding candidate characters may be confirmed and provided via the table lookup, and the time interval between inputting the phonetic notation and selecting the correct initial consonant is reduced, thus, inputting Chinese character in the phonetic-based mode is more convenient and faster.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A computer input system comprising:
    a storage unit storing a pre-determined symbol permutation order and four carry radices, wherein the four carry radices have one-to-one correspondences to an amount of initial consonants, an amount of head vowels, an amount of vowels and an amount of tones of a phonetic notation symbol, and each of the four carry radices is a positive integer;
    a representative number obtaining module obtaining four symbol representative numbers of a Chinese character according to a Chinese character phonetic notation; and
    a coding module coupled to the storage unit and the representative number obtaining module and generating a Chinese character coding number of the Chinese character by applying a mathematical operation on the symbol permutation order, the four carry radices and the four symbol representative numbers.

2. The computer input system according to claim 1, wherein the four carry radices are the amount of the initial consonants plus one, the amount of the head vowels plus one, the amount of the vowels plus one and the amount of the tones, respectively.

3. The computer input system according to claim 1, wherein 21 initial consonants of the phonetic notation symbol have a one-to-one correspondence to 21 initial consonant representative numbers, and when the Chinese character phonetic notation includes one of the 21 initial consonants, the representative number obtaining module takes one of the corresponding 21 initial consonant representative numbers as one of the four symbol representative numbers, and when the Chinese character phonetic notation does not include any of the 21 initial consonants, the representative number obtaining module takes a pre-determined representative number as one of the four symbol representative numbers.

4. The computer input system according to claim 1, wherein three head vowels of the phonetic notation symbol have a one-to-one correspondence to three head vowel representative numbers, when the Chinese character phonetic notation includes one of the three head vowels, the representative number obtaining module takes one of the three head vowel representative numbers as one of the four symbol representative numbers, and when the Chinese character phonetic notation does not include any of the three head vowels, the representative number obtaining module takes a pre-determined representative number as one of the four symbol representative numbers.

5. The computer input system according to claim 1, wherein 13 vowels of the phonetic notation symbol have a one-to-one correspondence to 13 vowel representative numbers, when the Chinese character phonetic notation includes one of the 13 vowels, the representative number obtaining module takes one of the 13 vowel representative numbers as one of the four symbol representative numbers, and when the Chinese character phonetic notation does not include any of the 13 vowels, the representative number obtaining module takes a pre-determined representative number as one of the four symbol representative numbers.

6. The computer input system according to claim 1, wherein five tones of the phonetic notation symbol have a one-to-one correspondence to five tone representative numbers, the representative number obtaining module obtains the tone of the Chinese character phonetic notation in the five tones, and takes the tone representative number corresponding to the obtained tone in the five tone representative numbers as one of the four symbol representative numbers.

7. The computer input system according to claim 1, wherein the coding module arranges the four symbol representative numbers according to the symbol permutation order, and defines a carry sequence of the four carry radices according to the symbol permutation order and relations between the four carry radices and the amount of the initial consonants, the amount of the head vowels, the amount of the vowels and the amount of the tones, and the coding module converts the four arranged symbol representative numbers to a decimal number according to the four carry radices and the carry sequence, and then takes the decimal number as the coding number of the Chinese character.

8. The computer input system according to claim 7, wherein the symbol permutation order from left to right is an initial consonant, a head vowel, a vowel and a tone.

9. The computer input system according to claim 1, wherein the storage unit further comprises:
a phonetic database;
wherein the coding module defines the Chinese character phonetic notation as a character pronunciation and records a relation between the character pronunciation and the coding number in the phonetic database.

10. An input method used in a computer input system with a storage unit, the input method comprising:
storing a symbol permutation order, four carry radices and a phonetic database in the storage unit, wherein the phonetic database records multiple character pronunciations and a coding number corresponding to each of the character pronunciations, each of the coding numbers is generated by applying a mathematical operation on four symbol representative numbers representing the character pronunciation, the symbol permutation order and the four carry radices, the four carry radices have a one-to-one correspondence to an amount of initial consonants, an amount of head vowels, an amount of vowels and an amount of tones of the phonetic notation symbol and each of the four carry radices is a positive integer, and the character pronunciations are stored in the phonetic database according to the corresponding coding numbers;
receiving an input of at least a phonetic notation;
obtaining four input symbol representative numbers representing the phonetic notation;
calculating a number according to the four carry radices, the symbol permutation order and the four input symbol representative numbers;
obtaining at least a Chinese character corresponding to the character pronunciation corresponding to the coding number in accordance with the number as at least a candidate character; and
selecting one of the candidate characters as an input character according to a selecting command.

11. The input method according to claim 10, wherein the step of obtaining the four input symbol representative numbers representing the phonetic notation comprises:
if the phonetic notation includes one of 21 initial consonants, taking an initial consonant representative number corresponding to one of the included 21 initial consonants as one of the four input symbol representative numbers; and
if the phonetic notation does not include any of the 21 initial consonants, taking a pre-determined representative number as one of the four input symbol representative numbers.

12. The input method according to claim 11, wherein the step of obtaining the four input symbol representative numbers representing the phonetic notation comprises:
if the phonetic notation includes one of the three head vowels, taking an head vowel representative number corresponding to one of the included three head vowels as one of the four input symbol representative numbers; and
if the phonetic notation does not include any of the three head vowels, taking a pre-determined representative number as one of the four input symbol representative numbers.

13. The input method according to claim 12, wherein the step of obtaining the four input symbol representative numbers representing the phonetic notation comprises:
if the phonetic notation includes one of the 13 vowels, taking an vowel representative number corresponding to one of the included 13 vowels as one of the four input symbol representative numbers; and
if the phonetic notation does not include any of the 13 vowels, taking a pre-determined representative number as one of the four input symbol representative numbers.

14. The input method according to claim 10, wherein the step of obtaining the four input symbol representative numbers representing the phonetic notation comprises:
if the phonetic notation includes one of the five tones, taking an tone representative number corresponding to one of the included five tones as one of the four input symbol representative numbers; and
if the phonetic notation does not include any of the five tones, taking a pre-determined representative number as one of the four input symbol representative numbers.

15. The input method according to claim 10, wherein the step of calculating the numbers according to the four carry radices, the symbol permutation order and the four input symbol representative numbers comprises:
arranging the four input symbol representative numbers according to the symbol permutation order;
defining a carry sequence of the four carry radices according to the symbol permutation order and the relations between the four carry radices and the amount of the initial consonants, the amount of the head vowels, the amount of the vowels and the amount of the tones;
converting the arranged four input symbol representative numbers to a decimal number according to the four carry radices and the carry sequence; and
taking the decimal number as the number.

16. The input method according to claim 10, wherein the symbol permutation order from left to right is an initial consonant, a head vowel, a vowel and a tone.

* * * * *